John F. Collins.
Horse Power.

No. 117516

Patented Aug 1 1871

Witnesses.
C. F. Brown
W. L. Colby

Inventor
John F. Collins
by H. W. Beadle & Co.

117,516

UNITED STATES PATENT OFFICE.

JOHN F. COLLINS, OF LODI, MISSISSIPPI.

IMPROVEMENT IN HORSE-POWERS.

Specification forming part of Letters Patent No. 117,516, dated August 1, 1871.

*To all whom it may concern:*

Be it known that I, JOHN F. COLLINS, of Lodi, in the county of Montgomery and State of Mississippi, have invented a new and useful Improvement in Horse-Powers; and I do hereby declare that the following is a full and exact description of the same, reference being had to the accompanying drawing and to the letters of reference marked thereon.

This invention relates to that class of horse-powers which is operated by means of a wheel and lever; and consists, mainly, in the arrangement of the lever relatively to the wheel, as will be fully described hereinafter.

Figure 1:
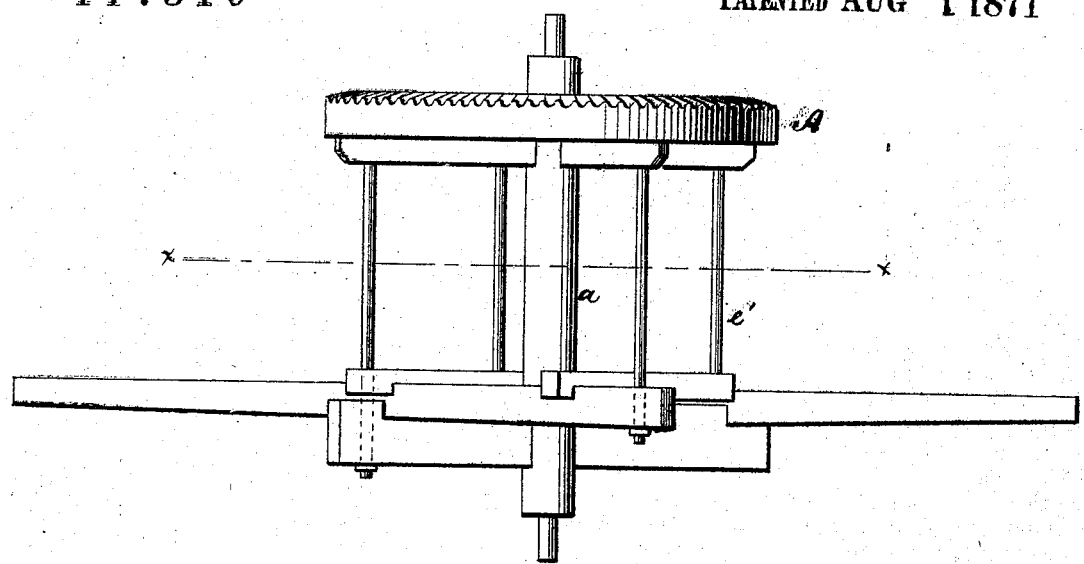
Figure 2:
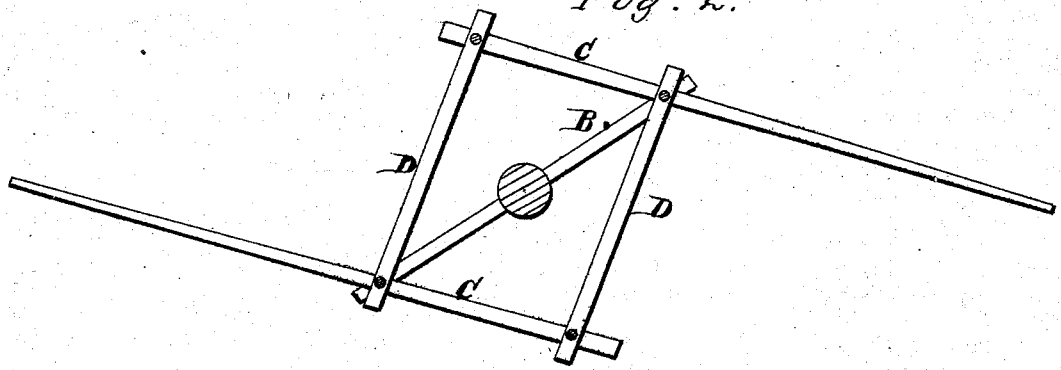
Figure 3:
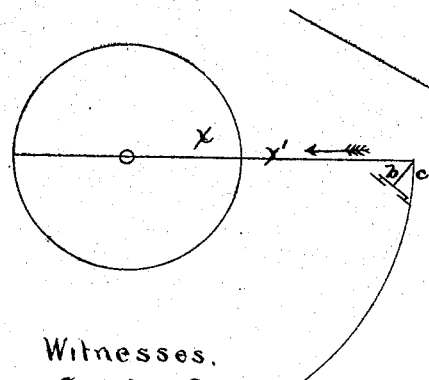
Figure 4:
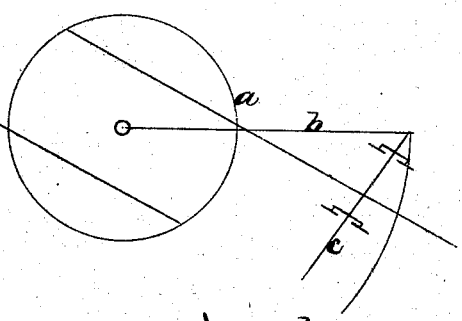

In the drawing, Figure 1 represents a side elevation of my invention as applied to a horse-power; Fig. 2, a plan view through the line $x\ x$, Fig. 1; Figs. 3 and 4, diagrams explanatory of the principle of my invention.

To enable others skilled in the art to make and use my invention, I will now proceed to describe fully its construction and manner of operation.

A represents a wheel, which may be of any proper construction and size, it being provided, of course, with the usual teeth for communicating its motion to any proper gearing. It is suitably secured, by arms or other proper connections, to a central shaft, $a$, which revolves in proper bearings. B represents a cross-beam inserted in shaft $a$ and located a proper distance below the wheel A, as shown. To the ends of the cross-beam the levers C are attached, in any suitable manner, at a point removed from their inner ends about one-third of their length. D D represent clamps or braces which connect the levers with each other, and which may, if desired, be extended into levers also. Suitable stanchions and brace-rods $e\ e'$ are employed to rigidly connect the wheel with the levers and frame-work below, as shown.

It will be observed that the levers are located away from the center-line of the wheel, the advantages of which arrangement will now be described. The levers to which the frame is attached in this class of horse-powers have been usually located in the same plane with the diameter line of the wheel, by which arrangement a large proportion of the power applied was necessarily lost, inasmuch as the line of draft did not coincide with the line of resistance. The truth of this statement will be readily perceived by an inspection of the diagram marked Fig. 3 in the drawing. $x$ represents a wheel having a lever, $x'$, attached thereto in line with the diameter of the wheel. $b$ represents the line of draft, and $c$ the line of direct resistance. It will be observed that one-half or nearly one-half of the power exerted by the animals is wasted in forcing the wheel against its bearing, as indicated by the arrow, the other half being employed to revolve the wheel.

By my arrangement this difficulty is obviated, as the line of draft coincides with the line of resistance, as indicated in the diagram marked Fig. 4 in the drawing. $a$ represents the wheel; $b$, the lever; $c$, the line of resistance and also the line of draft. By means of this arrangement of levers all the power applied is advantageously employed in moving the wheel, and not in producing undue friction between the parts.

A convenient rule for properly locating the levers relatively to the wheel may be stated as follows: Locate the levers in a line parallel with the line assumed by the evener of the whiffletrees when the animals are properly exerting their power.

Having thus fully described my invention, what I claim as new, and desire to secure by Letters Patent of the United States, is—

1. A horse-power wheel, having its levers relatively arranged, substantially as described.

2. The wheel described, with its levers, stanchions, and brace-rods, arranged as described, for the purpose set forth.

This specification signed and witnessed this 17th day of July, 1871.

J. F. COLLINS.

Witnesses:
   EDMUND BURKE,
   S. J. NOYES.